UNITED STATES PATENT OFFICE.

MARTIN E. FISHER, OF MINERAL CITY, OHIO.

MAKING HARD-RUBBER BALLS.

No. 810,740.  Specification of Letters Patent.  Patented Jan. 23, 1906.

Application filed April 26, 1905. Serial No. 257,396.

*To all whom it may concern:*

Be it known that I, MARTIN E. FISHER, a citizen of the United States, residing at Mineral City, in the county of Tuscarawas and State of Ohio, have invented a new and useful Improvement in Making Hard-Rubber Balls, of which the following is a specification.

The invention relates to the making of a hard-rubber ball for bowling or other similar purposes; and the object of the improvement is to make a strong, durable, and resilient ball of proper weight and suitable color which will take and keep a good polish and which will remain in a given position on a level surface even though finger-holes are provided in one side.

The ball is made of a relatively dense and heavy central part or core, with a more resilient and lighter outer or peripheral part. The central core is composed of two parts caoutchouc or india-rubber, preferably Para; two parts coal-flour, preferably cannel; one part sulfur-flour, preferably golden, and three parts talc-powder. The caoutchouc or india-rubber is first thoroughly masticated in the usual manner, as by passing it between serrated rolls. The coal and sulfur flours and the talc-powder are then thoroughly mixed with the masticated rubber, as by milling with hot rolls, during which milling the flours and powder are gradually applied to and worked into the rubber. A core-ball—say of four and one-half inches in diameter—is made of this composition by forming and compressing the same in a mold and therein vulcanizing it under high pressure for some three hours at about 300° Fahrenheit. The peripheral part is made of the same composition without the talc-powder—that is to say, it is composed of two parts caoutchouc or india-rubber, preferably Para; two parts coal-flour, preferably cannel, and one part sulfur-flour, preferably golden.

The caoutchouc or india-rubber is masticated, and the coal and sulfur flours are then mixed by milling in the same manner as described for the core composition. The peripheral composition is then molded around the vulcanized core-ball as a center to make a finished ball of, say, nine inches in diameter, which same is then vulcanized in the usual manner—that is to say, in a mold without any special pressure being applied thereto beyond that required for the mere molding. The use of talc for the core-ball and the greater pressure applied thereto in vulcanizing gives this part the desired greater density and weight, and the presence of the coal-flour in the composition gives the ball a jet-black color and enables it to be highly polished. It has been found empirically that a ball so made will remain quiescent in any given position on a level surface even though finger-holes are provided in one side thereof.

It is not essential that the prevulcanized core for the ball shall be made of the composition herein specified, for the well-known mixtures of india-rubber with sawdust, pulp, fiber, asbestos, and the like for vulcanizing can be used for this purpose; nor is it essential that the ingredients of the compositions herein described must be used in the exact proportions as stated, although the same have been found to give good results.

The coal-flour used in the composition of this ball is preferably made by crushing ordinary cannel-coal, then grinding it between corrugated rolls, then powdering it between smooth rolls, and then bolting it through a screen of about one hundred and forty mesh, and the sulfur-flour is an ordinary article of commerce, and the particular brand known to the trade as "golden" sulfur floured is preferably used. The hard-rubber ball thus made, which is described, but not claimed herein, will be made the subject-matter of another application for Letters Patent.

What I claim as my invention, and desire to secure by Letters Patent, is—

1. The process of making a hard-rubber ball consisting in masticating two parts india-rubber and hot-milling ther with two parts coal-flour, one part sulfur- our and three part talc-powder, then molding and vulcanizing under high pressure a core-ball of this composition and then molding on the core-ball as a center and vulcanizing under low pressure a larger ball of the same composition, less the talc.

2. The process of making a hard-rubber ball consisting in mixing india-rubber with coal-flour, sulfur-flour and talc-powder, and molding and vulcanizing under high pressure a core-ball of this composition, then molding on the core-ball as a center and vulcanizing under low pressure a larger ball of the same composition, less the talc.

3. The process of making a hard-rubber ball consisting in mixing india-rubber with coal-flour, sulfur-flour and talc-powder and molding and vulcanizing under high pressure a core-ball of this composition, and then molding on the core-ball as a center a larger ball of india-rubber composition.

4. The process of making a hard-rubber ball consisting in molding and vulcanizing under high pressure a core-ball of india-rubber composition, and then molding on the core-ball as a center and vulcanizing under low pressure a larger ball of a composition made by mixing india-rubber with coal-flour, and sulfur-flour.

5. The process of making a hard-rubber ball consisting in molding and vulcanizing under high pressure a core-ball of india-rubber composition, and then molding on the core-ball as a center and vulcanizing under low pressure a larger ball of a similar composition.

In testimony whereof I have signed my name to this specification in the presence of two subscribing witnesses.

MARTIN E. FISHER.

Witnesses:
HARRY FREASE,
MINNIE F. ANTHONY.